(12) United States Patent
Salisbury et al.

(10) Patent No.: US 10,419,691 B2
(45) Date of Patent: Sep. 17, 2019

(54) OPTICAL DATA INSERTION DEVICES

(71) Applicant: Thermoteknix Systems Ltd., Cambridge (GB)

(72) Inventors: Richard Salisbury, Cambridge (GB); Bruce Cairnduff, Cambridge (GB)

(73) Assignee: Thermoteknix Systems Limited, Cambridge (GB)

( * ) Notice: Subject to any disclaimer, the term of this patent is extended or adjusted under 35 U.S.C. 154(b) by 365 days.

(21) Appl. No.: 14/645,739

(22) Filed: Mar. 12, 2015

(65) Prior Publication Data

US 2015/0260887 A1 Sep. 17, 2015

(30) Foreign Application Priority Data

Mar. 13, 2014 (GB) .................................. 1404509.0

(51) Int. Cl.
| | | |
|---|---|---|
| *G02B 5/28* | (2006.01) | |
| *G02B 23/10* | (2006.01) | |
| *G02B 5/20* | (2006.01) | |
| *H04N 5/33* | (2006.01) | |
| *H04N 5/225* | (2006.01) | |
| *F41G 1/38* | (2006.01) | |
| *F41G 1/473* | (2006.01) | |
| *F41G 3/00* | (2006.01) | |
| *G02B 23/12* | (2006.01) | |
| *G02B 27/00* | (2006.01) | |

(52) U.S. Cl.
CPC ................. *H04N 5/33* (2013.01); *F41G 1/38* (2013.01); *F41G 1/473* (2013.01); *F41G 3/00* (2013.01); *G02B 5/201* (2013.01); *G02B 5/281* (2013.01); *G02B 23/10* (2013.01); *G02B 23/12* (2013.01); *G02B 27/0018* (2013.01); *H04N 5/2254* (2013.01)

(58) Field of Classification Search
CPC .................................. G02B 5/28; G02B 5/281
See application file for complete search history.

(56) References Cited

U.S. PATENT DOCUMENTS 4,653,879 A * 3/1987 Filipovich ............ G02B 23/125
250/330
4,707,595 A * 11/1987 Meyers .................. G02B 23/12
250/333

(Continued)

FOREIGN PATENT DOCUMENTS

| GB | 2496878 A | 5/2013 |
| WO | WO2005043231 A2 | 5/2005 |

*Primary Examiner* — Marcus H Taningco
*Assistant Examiner* — Djura Malevic
(74) *Attorney, Agent, or Firm* — Barlow, Josephs & Holmes, Ltd.

(57) ABSTRACT

An optical data insertion device for an optical system includes a projector operable to insert additional optical data into a capture aperture of the optical system so as to provide a combined image and a reflection barrier. The reflection barrier includes a secondary filter and a primary filter adapted to fit over the rest of the capture aperture of the optical system. The secondary filter is a band pass filter adapted to allow the transmission of a narrow pass band centerd on the peak emission wavelength of the projector. The primary filter is a narrow band stop filter that blocks the transmission of a narrow band of light corresponding to that allowed to pass by the band pass filter.

25 Claims, 3 Drawing Sheets

(56) References Cited

U.S. PATENT DOCUMENTS

| | | | | |
|---|---|---|---|---|
| 4,794,430 A | * | 12/1988 | Whittaker | F41G 3/06 345/82 |
| RE33,572 E | * | 4/1991 | Meyers | G02B 23/12 250/333 |
| 5,079,416 A | * | 1/1992 | Filipovich | G02B 23/125 250/214 VT |
| 6,333,826 B1 | * | 12/2001 | Charles | G02B 13/06 359/725 |
| 6,786,617 B2 | * | 9/2004 | Lemay | B60Q 3/14 257/E25.02 |
| 2003/0155513 A1 | * | 8/2003 | Remillard | G01S 7/484 250/341.8 |
| 2012/0194550 A1 | * | 8/2012 | Osterhout | G02B 27/0093 345/633 |
| 2012/0242678 A1 | * | 9/2012 | Border | G02B 27/0093 345/589 |
| 2012/0249797 A1 | * | 10/2012 | Haddick | G06F 1/163 348/158 |
| 2012/0257030 A1 | | 10/2012 | Lim et al. | |
| 2013/0016220 A1 | | 1/2013 | Brown | |
| 2013/0278631 A1 | * | 10/2013 | Border | G02B 27/017 345/633 |

\* cited by examiner

OPTICAL DATA INSERTION DEVICES

TECHNICAL FIELD OF THE INVENTION

The present invention relates to a reflection barrier for an optical data insertion device and to an optical data insertion device incorporating such a barrier.

BACKGROUND TO THE INVENTION

In certain circumstances it may be desirable to combine image information from two or more sources to provide a composite image. One such occasion is where it is desirable to provide text data (such as range or similar) over an image. Another such occasion is where it may be desirable to combine image data from an image intensifier ($I^2$) with image data obtained from a thermal imager. An image intensifier amplifies visible light and near infra red light (say 400 nm-900 nm in wavelength); whilst a thermal imager operates in a further portion of the infra red light spectrum (say 7000 nm-14000 nm in wavelength). This is advantageous as the longer wavelengths are generally less attenuated by smoke and dust, although image intensifiers generally have better resolution than thermal imagers.

Current night vision systems using image intensification benefit from higher resolution and more natural imaging in comparison to imaging in the far infrared. However, $I^2$ systems are limited in so far as they do need at least some ambient light to operate. A typical intensifier tube becomes noise limited at around 100 μlux which corresponds to a moonless overcast night sky. At this point and at lower light levels effective night vision requires infrared systems.

Thermal imaging also offers advantages over $I^2$ in detecting targets concealed by camouflage. Addressing $I^2$ limitations by including a thermal imaging capability improves overall night vision performance but at the expense of complexity and weight. Hand held systems are easy to interchange when each system is self contained with its own optics, display and power supply. On the other hand helmet or system mounted image intensifiers cannot be easily swapped over.

An example of an apparatus that provides this image combination is disclosed in US2008/0302966. In this system, a conventional image intensifier is provided with a clip on attachment comprising a thermal imager, a projector operable to project a visible image captured by the thermal imager and a light turning element which turns light from the projector into the aperture of the image intensifier. In this manner light from the thermal imager and the image intensifier may be combined to provide a single image.

One potential disadvantage of this arrangement is that a small amount of the light emitted by the projector may be reflected off the front lens of the image intensifier or from the internal elements of the image intensifier. This reflected light may draw attention to a user of the device. In particular, this light may be more readily detected by others using image intensifier based devices. Whilst this issue can be partially mitigated by reducing the light output by the projector, this may not be practical or desirable in some circumstances.

It is therefore an object of the present invention to provide a reflection barrier for an optical data insertion device and to an optical data insertion device incorporating such a barrier that at least partly overcomes or alleviates the above problems.

SUMMARY OF THE INVENTION

According to a first aspect of the present invention there is provided a reflection barrier suitable for use with an optical insertion device of the type comprising a projector operable to insert additional optical data into a capture aperture of an optical system so as to provide a combined image, the barrier comprising: a primary filter adapted to cover the capture aperture of the optical system, the primary filter having an aperture or cutaway portion aligned with the light emitted by the projector into the capture aperture.

In this manner the reflection barrier allows light emitted by the projector to pass into the capture aperture but blocks reflections of projected light from leaving the optical system. As such, these reflections cannot be detected by others in the vicinity.

Preferably, the primary filter is a band stop filter. The stop band of the band stop filter is preferably related to the spectrum of reflected light. The spectrum of reflected light is dependent upon the spectrum of projected light and the reflection characteristics of the optical system. In particular, the stop band may be selected to substantially correspond to the peak emission wavelength of the projector.

In a further preferred embodiment, a secondary filter may be provided to filter the projected light before it is incident on the aperture or cutaway portion of the primary filter. The secondary filter preferably comprises a band pass filter. In such embodiments, the pass band of the band pass filter is preferably related to the spectrum of projected light. In particular, the pass band may be selected to substantially correspond to the peak emission wavelength of the projector.

Preferably, the secondary filter is a narrow band pass filter and the primary filter is a narrow band stop filter. The primary filter may be operable to block a wavelength band substantially matching the pass band of the secondary filter. Alternatively, the primary filter may be operable to block a wavelength band slightly wider than the pass band of the secondary filter. Embodiments wherein the primary filter is a band stop filter with a stop band corresponding to the pass band of the secondary filter minimise the reduction in intensity of ambient light incident on the capture aperture whilst maximising the potential for blocking reflected light from the projector.

The projector may be adapted to emit light directly into the optical system. Alternatively, the projector may comprise or be provided with a light guiding arrangement for guiding light emitted by the projector into the optical system. In particular, the light guiding arrangement may comprise a periscope element and a light directing element. This can enable the projector to be provided alongside the capture aperture and for light emitted by the projector to be guided into the capture aperture by a relatively narrow guiding arrangement, minimising the impact on the capture of light by the optical system.

The secondary filter may be provided within the aperture or cutaway portion of the primary filter. Alternatively, the secondary filter may be aligned with the aperture or cutaway portion of the primary filter. In such cases, the secondary filter may be incorporated into the projector or may be incorporated into the light guiding arrangement for directing light from the projector into the capture aperture of the optical system.

The projector is preferably operable to emit monochrome light or a narrow waveband of light. The projector may be an LED projector or an OLED projector. In some embodiments, the screen may be an LCD projector. In one embodiment, the projector is an OLED projector, the band pass filter is operable to allow the transmission of light having a wavelength of 532 nm and the band stop filter is operable to block the transmission of light having a wavelength of 532 nm.

In a preferred embodiment, a lens spacer element may define the aperture or the cutaway portion in the primary filter. The lens spacer may comprise a tube projecting forward of the primary filter. The lens spacer may be adapted to abut and surround the projector. This can provide a further barrier to reflection of the light emitted by the projector.

The spacer may be formed from any suitable material including metal, plastic or rubber. Preferably, the spacer is formed from or coated by a black or anti reflective material. The surface of the secondary filter may additionally be partially coated with a black or anti-reflective coating. This can block reflections of off axis rays emitted by the projector.

The primary filter may be provided within a frame adapted for attachment to the capture aperture of the optical system. The frame may be formed from any suitable material including metal, plastic or rubber. Preferably, the frame is formed from or coated by a black or anti reflective material. In a preferred embodiment, the frame may comprise a threaded ring adapted to fit around the capture aperture of the optical system. Preferably, the threaded ring is operable in cooperation with a thread provided on the capture aperture to allow axial adjustment of the barrier. The axial adjustment can enable optimum positioning of the barrier relative to the projector or the light guiding arrangement of the projector. The frame may comprise a knurled face or edge. This can aid user adjustment of the frame and hence the reflection barrier.

The optical system may comprise a mirror and/or lens arrangement such as a telescope, sight, or similar. In alternative embodiments, the optical system may comprise a light sensing system operable in response to incident light to generate an image at a display screen. The light sensing system may be an image intensifier, imaging array or the like.

The projector may be provided with means for receiving control signals from an external device. The external device may be a secondary optical system. In some embodiments, the secondary optical system may be mounted to or alongside the optical system or the projector. The secondary optical system may comprise a light sensing system such as an image intensifier, imaging array or the like. In a particularly preferred embodiment, the secondary optical system may comprise an infra red imaging array.

The inserted optical data may include, but is not limited to text (including alphanumeric characters and symbols), icons, images or any mixture of the foregoing. In particular, the inserted optical data may comprise or relate to the output of a secondary optical system. In particular, the inserted optical data may comprise an image captured by the secondary optical system or a processed version of an image captured by the secondary optical system. In particular, the processing may involve edge detection and generating an outline image.

The inserted data may be of constant brightness or may vary in brightness. Varying the intensity of the inserted data can reduce the possibility that the inserted data swamps the primary image or vice versa. Additionally or alternatively, it can help to differentiate between the primary image and the inserted data.

The variation may be automatically controlled by a variation control unit. This frees a user of the device from attending to this control thus making the device easier to use and more likely to select an optimum intensity level. In some embodiments, the variation control unit may further comprise a user operable intensity control input.

The automatic variation control may be responsive to specified parameters. Suitable parameters may include, but are not limited to: the intensity of the primary image, settings or sensors on the primary optical system, ambient light levels or the like. In this manner, the variation control unit may reduce the projector intensity in response to low ambient light levels or a low intensity of the primary image.

The automatic variation control may be responsive to a timer input. In particular, the timer input may be a periodic or pulsed timer input. The periodic or pulsed input can have any suitable form and any suitable frequency. In this manner, a human observer can readily identify that part of a composite image that is provided by projected light.

According to a second aspect of the present invention there is provided an optical data insertion device for an optical system comprising: a projector operable to insert additional optical data into a capture aperture of the optical system so as to provide a combined image; and a reflection barrier according to the first aspect of the present invention.

The optical data insertion device of the second aspect of the invention may incorporate any or all of the features of the first aspect of the present invention, as desired or as appropriate.

According to a third aspect of the present invention there is provided a projector for an optical data insertion device for an optical system operable to insert additional optical data into a capture aperture of the optical system so as to provide a combined image wherein the optical system is provided with a reflection barrier according to the first aspect of the present invention, the projector further comprising: a band pass filter to filter light emitted by the projector The projector device of the third aspect of the invention may incorporate any or all of the features of the first or second aspects of the present invention, as desired or as appropriate.

According to a fourth aspect of the present invention there is provided a thermal imaging attachment for an image intensifier comprising: an optical data insertion device according to the second aspect of the present invention or a projector according to the third aspect of the present invention; and a thermal imaging device operable to capture a thermal image and output a signal indicative thereof to the projector for output.

The thermal imaging attachment may incorporate any or all of the features of the first, second or third aspects of the present invention, as desired or as appropriate.

The thermal imaging attachment may be adapted to be connected to body mounted or equipment mounted image intensifiers.

BRIEF DESCRIPTION OF THE DRAWING FIGURES

In order that the invention may be more clearly understood embodiments thereof will now be described, by way of example only, with reference to the accompanying drawings, of which:

DETAILED DESCRIPTION OF THE EXEMPLARY EMBODIMENTS

Figure 1:
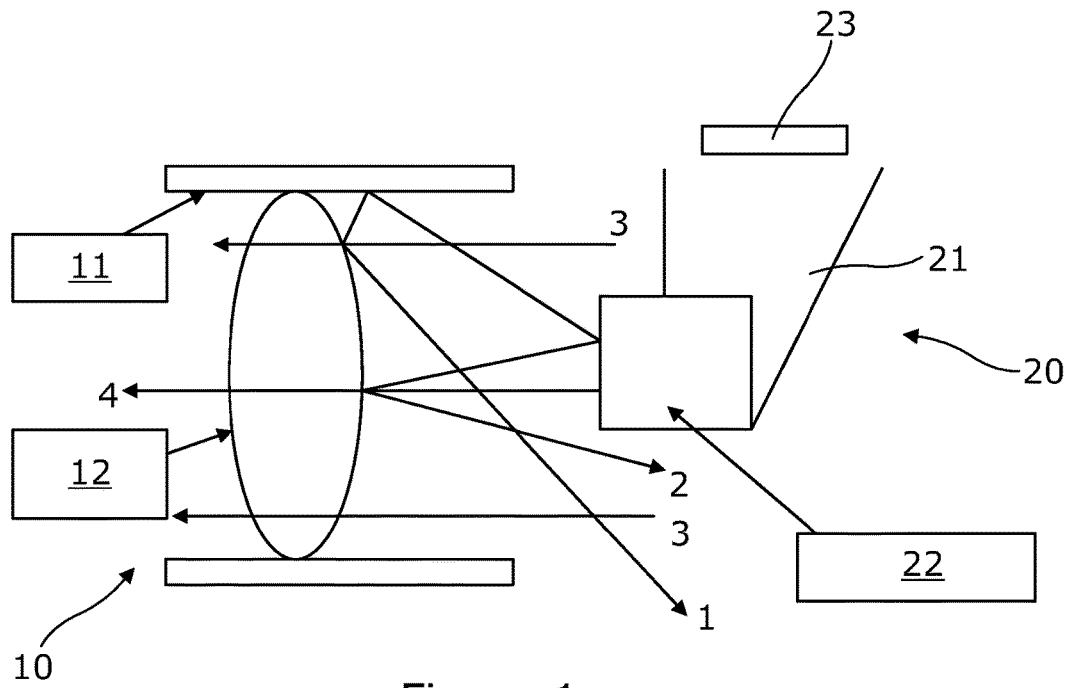
FIG. 1 is a schematic view of a thermal imaging attachment for an image intensifier according to the prior art.

Turning now to FIG. 1, a thermal imaging attachment 20 for an image intensifier 10 comprises a periscope element 21 and a light directing element 22. The thermal imaging attachment 20 includes an attachment means 24, i.e. clamp ring, for attaching the thermal imaging device to the image intensifier 10. The attachment 20 thereby serves to direct light emitted by projector 23 into the capture aperture (defined by tube walls 11) of image intensifier 10. As is shown in FIG. 1, the intensifier 10 will typically comprise a lens 12 within the tube to focus incident light (illustrated by rays 3).

Whilst most of the light directed by the light directing element 22 passes directly into the intensifier 10 (illustrated by ray 4) a proportion is reflected by lens 12 (illustrated by ray 2). Additionally, some off axis emissions (illustrated by ray 1) may also be reflected from the tube walls 11 and/or the lens 12 and escape. It is possible that the reflected light (1, 2) might be detected by others nearby, particularly if they are using image intensifiers. This can potentially render the position of the user of the attachment 20 known.

Figure 2:
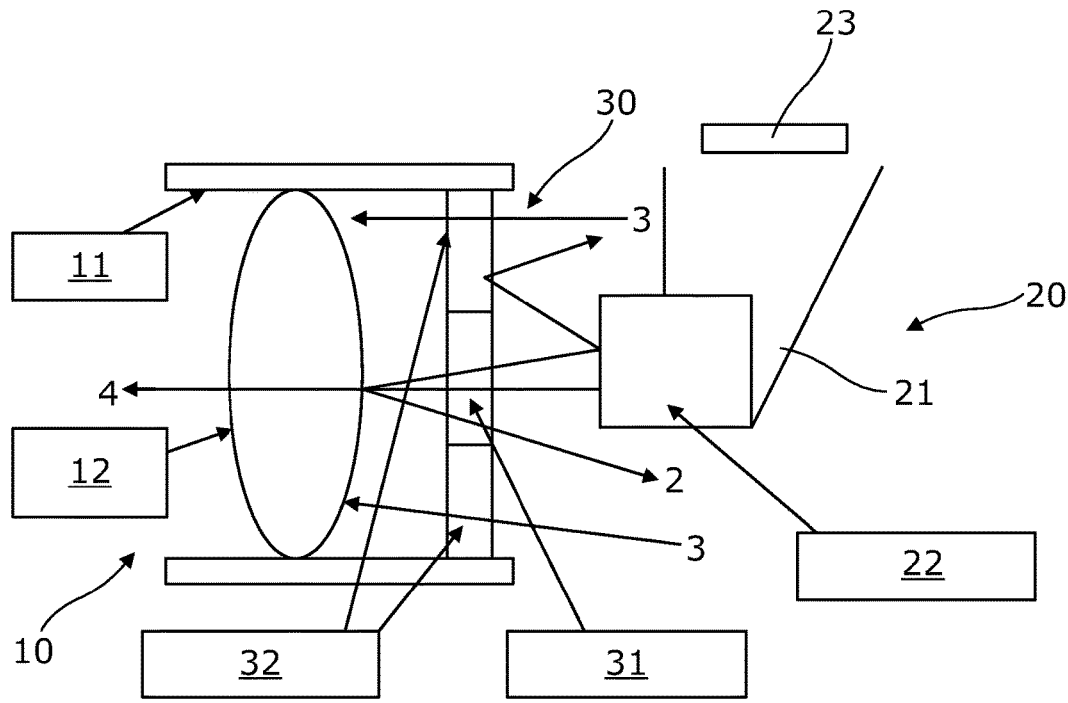
FIG. 2 is a schematic view of a thermal imaging attachment for an image intensifier fitted with a first embodiment of a reflection barrier according to the present invention.

To reduce this possibility, the image intensifier can be provided with a reflection barrier 30 as shown in FIG. 2. The reflection barrier 30 comprises a secondary filter 31 aligned with the light directing element 22 and a primary filter 32 adapted to fit over the rest of the capture aperture of the intensifier 10. The secondary filter 31 comprises a band pass filter adapted to allow the transmission of a narrow pass band centred on the peak emission wavelength of the projector 23 (say 532 nm for an OLED projector 23). The primary filter 32 comprises a narrow band stop filter 32 (typically referred to as a notch filter) that blocks the transmission of a narrow band of light (say 532 nm for an OLED projector 23) corresponding to that allowed to pass by the band pass filter 31. Typically, the stop band of the band stop filter 32 is substantially the same as or slightly wider than the pass band of the band pass filter 31. As such, the band stop filter 32 specifically blocks reflections whilst having minimal impact on other light incident on the capture aperture.

With the arrangement of FIG. 2, most light emitted by the projector 23 passes along the periscope element 21 and is directed by the light directing element 22 into the band pass filter and is detected by the intensifier 10. Most of the light reflected from the tube walls 11 or the lens 12 is blocked from leaving the intensifier 10 by the band stop filter 32. Nevertheless, since a small gap exists between the light directing element 22 and the barrier 30, there it is possible that some off axis rays 1 may be reflected from the band stop filter 32 and escape. Additionally, some on axis rays 2 may be reflected back off the lens 12 through the band pass filer 31 and escape.

Figure 3:
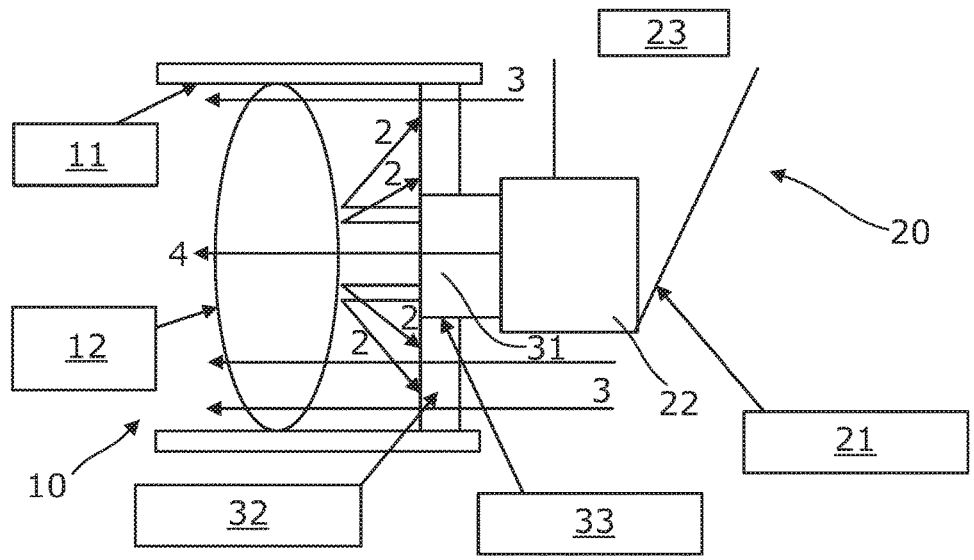
FIG. 3 is a schematic view of a thermal imaging attachment for an image intensifier fitted with a second embodiment of a reflection barrier according to the present invention.

To further reduce the prospect of reflections, an alternative embodiment of a reflection barrier 30 is shown in FIG. 3. In this embodiment, the barrier is further provided with a lens spacer 33. The lens spacer 33 comprises an opaque tube within which is provided the band pass filter 31. The lens spacer 33 projects forward of the band stop filter 32 so as to substantially abut the light directing element 22. Where necessary, the axial position of the barrier 30 may be adjusted so that the lens spacer 33 snugly fits the light directing element 22. By abutting the light directing element 22, the lens spacer 33 prevents off axis rays (such as 1 in FIG. 2) from reflecting off the band stop filter 32 and prevents any rays reflected by the lens 12 (such as 2 in FIG. 2) from passing back through the band pass filter 31 and escaping.

Figures 4B, 4D:
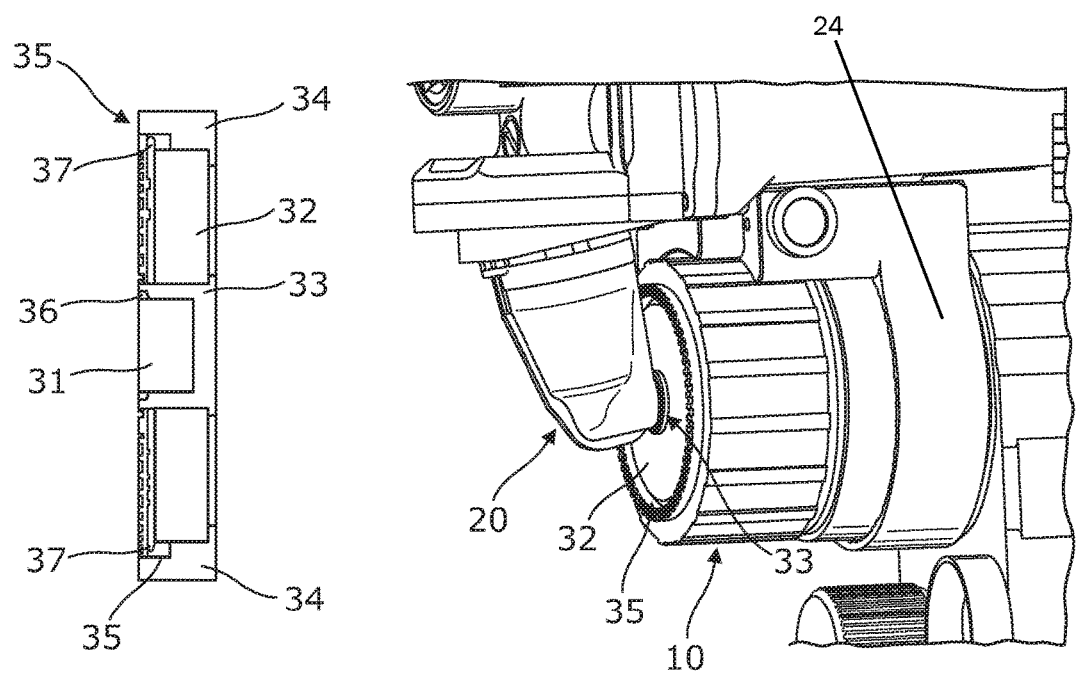
FIG. 4b shows a cross-sectional view of a specific embodiment of the reflection barrier of FIG. 3 in greater detail.
FIG. 4d shows the reflection barrier of FIGS. 4 a-c fitted to a thermal imaging attachment for an image intensifier.
Figure 4A:
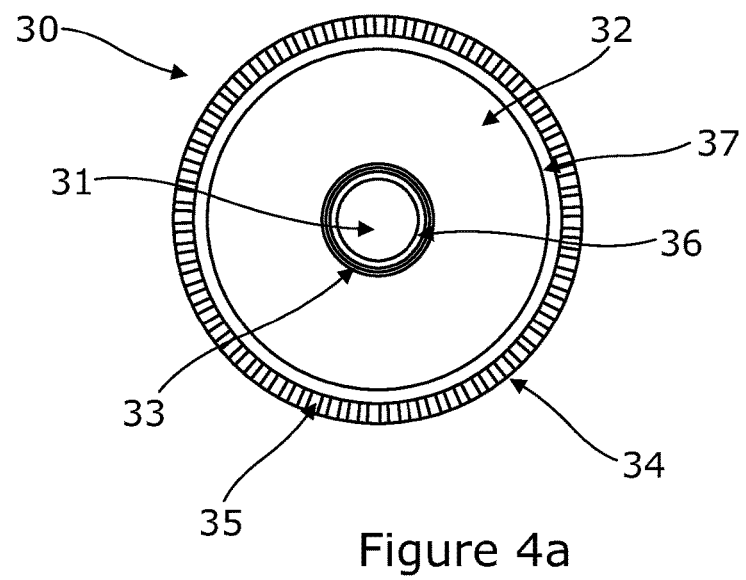
FIG. 4a shows a front view of a specific embodiment of the reflection barrier of FIG. 3 in greater detail.
Figure 4C:
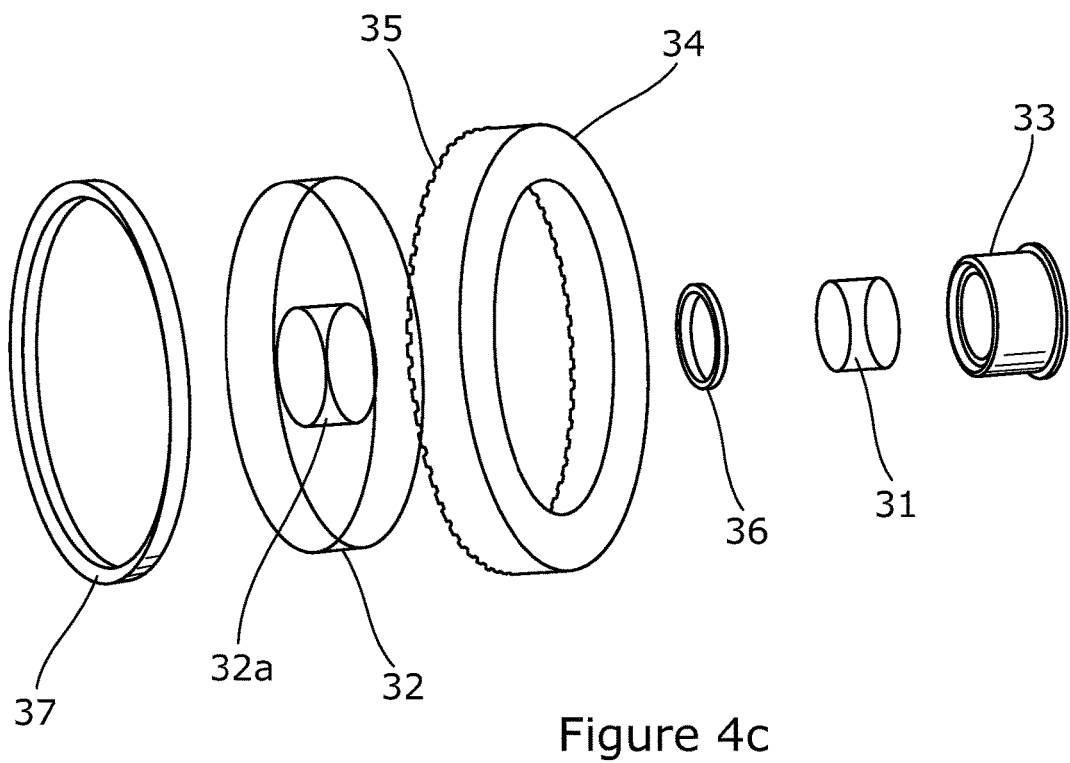
FIG. 4c shows an exploded view of a specific embodiment of the reflection barrier of FIG. 3 in greater detail.

Turning now to FIGS. 4 a-d, one specific embodiment of a reflection barrier 30 is shown in more detail. In this embodiment, the pass band filter 31 is fitted within a lens spacer 33 comprising an opaque tube. The band stop filter 32 is provided with an aperture 32a corresponding to the lens spacer 33. The band stop filter 32 is further adapted to fit within a frame 34 adapted to fit to an intensifier tube 11. Typically, the frame 34 will be provided with a threaded portion or other cooperating features to facilitate this attachment. The thread may cooperate with a corresponding thread on the intensifier tube to enable axial adjustment of the barrier 30. This can help ensure that the lens spacer 33 is positioned correctly relative to the light directing element 22 so as to minimise the escape of projected light. To this end, the frame 34 may be provided with a knurled face 35 facilitating easy adjustment by a user. Both the band pass filter 31 and band stop filter 32 may be sealed in position by use of sealing rings 37, 36 and/or a suitable adhesive or potting compound.

Whilst the above describes preferred embodiments of the invention, the skilled man will appreciate that other variations on the above embodiments are also possible. For instance, it is possible to omit the secondary filter 31 or to incorporate the secondary filter 31 directly into or fit the secondary filter 31 to the projector 23, periscope element 21 or light directing element 22. Furthermore, whilst the above embodiments show a secondary filter 31 provided in an aperture 32a at the centre of primary filter 32, the aperture 32a may be off centre or may be replaced by a cutaway portion at the edge of the primary filter 32.

The above embodiments are described by way of example only. Many variations are possible without departing from the scope of the invention as defined in the appended claims.

The invention claimed is:

1. An optical data insertion device for an optical system, the optical data insertion device comprising:
 a projector operable to insert additional optical data into a capture aperture of the optical system so as to provide a combined image, wherein the projector comprises or is provided with a light guiding arrangement comprising a periscope element and a light directing element for guiding light emitted by the projector into the capture aperture;
 a reflection barrier comprising:
  a primary filter adapted to cover the capture aperture of the optical system, the primary filter having an aperture or cutaway portion aligned with the light emitted by the projector into the capture aperture, and
  a lens spacer which defines the aperture or the cutaway portion in the primary filter, the lens spacer comprising a tube projecting forward of the primary filter and the lens spacer abutting or surrounding the light guiding arrangement; and an attachment means for attaching the optical data insertion device to the optical system.

2. An optical data insertion device as claimed in claim 1 wherein the primary filter is a band stop filter.

3. An optical data insertion device as claimed in claim 2 wherein the stop band of the band stop filter is selected to correspond to the peak emission wavelength of the projector.

4. An optical data insertion device as claimed in claim 1 wherein, a secondary filter is provided to filter the projected light before it is incident on the aperture or cutaway portion of the primary filter.

5. An optical data insertion device as claimed in claim 4 wherein the secondary filter is aligned with the aperture or cutaway portion of the primary filter.

6. An optical data insertion device as claimed in claim 4 wherein the secondary filter is a band pass filter.

7. An optical data insertion device as claimed in claim 6 wherein the primary filter is a band stop filter and is operable to block a wavelength band wider than the pass band of the secondary filter.

8. An optical data insertion device as claimed in claim 4 wherein the secondary filter is provided within the aperture or cutaway portion of the primary filter.

9. An optical data insertion device as claimed in claim 4, wherein the surface of the secondary filter is partially coated by a black or anti-reflective coating.

10. An optical data insertion device as claimed in claim 1 wherein the optical system comprises any one of: a mirror and/or lens arrangement or a light sensing system operable in response to incident light to generate an image at a display screen such as image intensifier or imaging array.

11. An optical data insertion device as claimed in claim 1 wherein the projector is adapted to emit light directly into optical system.

12. An optical data insertion device as claimed in claim 1 wherein the projector is provided with means for receiving control signals from an external device.

13. An optical data insertion device as claimed in claim 12 wherein the external device is a secondary optical system.

14. An optical data insertion device as claimed in claim 13 wherein the secondary optical system comprises an infra-red imaging array.

15. An optical data insertion device as claimed in claim 13 wherein the inserted optical data comprises an image captured by the secondary optical system or a processed version of an image captured by the secondary optical system.

16. An optical data insertion device as claimed in claim 1 wherein the inserted optical data includes but is not limited to text (including alphanumeric characters and symbols), icons, images or any mixture of the foregoing.

17. An optical data insertion device as claimed in claim 1 wherein the inserted data varies in brightness.

18. A projector for an optical data insertion device of claim 1, the projector further comprising: a band pass filter to filter light emitted by the projector.

19. An optical data insertion device as claimed in claim 18 wherein the band pass filter is incorporated into the projector.

20. An optical data insertion device as claimed in claim 18 wherein the band pass filter is incorporated into the light guiding arrangement.

21. An optical data insertion device as claimed in claim 1, wherein the spacer is formed from or coated by a black or anti-reflective material.

22. An optical data insertion device for an optical system, the optical system including tube walls, a lens within the tube walls and a capture aperture, the optical data insertion device comprising:
    a projector operable to insert additional optical data into the capture aperture of the optical system so as to provide a combined image,
    wherein the projector comprises a light guiding arrangement comprising
        a periscope element, and
        a light directing element for guiding light emitted by the projector into the capture aperture;
    a reflection barrier comprising
        a primary filter adapted to cover the capture aperture of the optical system, the primary filter comprising a band stop filter, the primary filter having an aperture portion aligned with the light emitted by the projector into the capture aperture, wherein a tubular lens spacer defines the aperture portion in the primary filter, the tubular lens spacer projecting forward of the primary filter and the lens spacer abutting or surrounding the light guiding arrangement;
        a secondary filter disposed within the lens spacer, the secondary filter comprising a band pass filter, said secondary filter allowing light from the projector to enter the capture aperture through the lens spacer, said primary filter preventing light reflected back from a lens within the tube walls from escaping through the capture aperture; and
    an attachment ring for attaching the optical data insertion device to an outside surface of the tube walls of the optical system.

23. The optical data insertion device of claim 22, wherein the band stop filter and the band pass filter are both selected to correspond to the peak emission wavelength of the projector.

24. An optical data insertion device for an optical system, the optical data insertion device comprising:
    a projector operable to insert additional optical data into a capture aperture of the optical system so as to provide a combined image; wherein the projector comprises or is provided with a light guiding arrangement comprising a periscope element and a light directing element for guiding light emitted by the projector into the capture aperture;
    an attachment means for attaching the optical data insertion device to the optical system; and
    a reflection barrier comprising: a primary filter adapted to cover the capture aperture of the optical system, the primary filter having an aperture or cutaway portion aligned with the light emitted by the projector into the capture aperture; and a frame in which the primary filter is provided, the frame adapted for attachment to the capture aperture of the optical system and comprising a threaded ring adapted to fit around the capture aperture of the optical system and operable in cooperation with a thread provided on the capture aperture to allow axial adjustment of the reflection barrier.

25. An optical data insertion device as claimed in claim 24, wherein the frame comprises a knurled face or edge.

* * * * *